United States Patent
Brydegaard

(10) Patent No.: US 11,169,272 B2
(45) Date of Patent: Nov. 9, 2021

(54) HIGH SPECTRAL RESOLUTION SCHEIMPFLUG LIDAR

(71) Applicant: NEOLund AB, Lund (SE)

(72) Inventor: Mikkel Brydegaard, Lund (SE)

(73) Assignee: NEOLund AB, Lund (SE)

( * ) Notice: Subject to any disclaimer, the term of this patent is extended or adjusted under 35 U.S.C. 154(b) by 0 days.

(21) Appl. No.: 16/623,743

(22) PCT Filed: Jul. 14, 2018

(86) PCT No.: PCT/SE2018/050768
§ 371 (c)(1),
(2) Date: Dec. 17, 2019

(87) PCT Pub. No.: WO2019/013698
PCT Pub. Date: Jan. 17, 2019

(65) Prior Publication Data
US 2020/0217791 A1 Jul. 9, 2020

(30) Foreign Application Priority Data

Jul. 14, 2017 (SE) .................................. 1730197-9
Mar. 21, 2018 (SE) .................................. 1830093-9

(51) Int. Cl.
*G01N 21/47* (2006.01)
*G01N 21/45* (2006.01)
(Continued)

(52) U.S. Cl.
CPC .............. *G01S 17/95* (2013.01); *G01N 21/39* (2013.01); *G01N 21/45* (2013.01); *G01N 21/47* (2013.01);
(Continued)

(58) Field of Classification Search
CPC ......... G01S 17/95; G01S 7/481; G01N 21/39; G01N 21/45; G01N 21/47; G01N 21/532;
(Continued)

(56) References Cited

U.S. PATENT DOCUMENTS 4,988,190 A  1/1991  Miles
5,026,991 A  6/1991  Goldstein et al.
(Continued)

FOREIGN PATENT DOCUMENTS

WO     WO 08096524     8/2008
WO     WO 2010 026579   3/2010
WO     WO 2012 105973   8/2012

OTHER PUBLICATIONS

Liang Mei & Mikkel Brydegaard, "Atmospheric aerosol monitoring by an elastic Scheimpflug Lidar system", Optics Express vol. 23., No. 24 (2015). DOI: 10.1364/OE.23.0A1613; figures 1, 4; Sections 2.2, 3.1, 4.1.

(Continued)

*Primary Examiner* — Isiaka O Akanbi
(74) *Attorney, Agent, or Firm* — Knobbe Martens Olson & Bear, LLP

(57) ABSTRACT

A method is provided for detecting a property of a gas comprising: emitting a light, comprising a plurality of wavelengths covering a plurality of absorption lines of the gas, along a first axis, the light being scattered by particles of the gas resulting in a scattered light, generating a sensor image using a detection arrangement configured to receive the scattered light and comprising: an optical arrangement having an optical plane and being configured to direct the scattered light on to a light sensor, the light sensor having at least one pixel columns, wherein the pixel columns are aligned to an image plane and configured to output a sensor image, wherein the first axis, the optical plane, and the image plane intersect such that a Scheimpflug condition is (Continued)

achieved, determining, from the sensor image, properties of the gas at a plurality of positions along the first axis.

24 Claims, 3 Drawing Sheets

(51) Int. Cl.
  *G01N 21/53* (2006.01)
  *G01S 17/95* (2006.01)
  *G01N 21/39* (2006.01)
  *G01S 7/481* (2006.01)

(52) U.S. Cl.
  CPC ............ *G01N 21/532* (2013.01); *G01S 7/481* (2013.01); *G01N 2021/398* (2013.01); *G01N 2021/399* (2013.01); *G01N 2021/4709* (2013.01)

(58) Field of Classification Search
  CPC ....... G01N 2021/398; G01N 2021/399; G01N 2021/4709
  USPC ................. 356/438, 28.5, 338, 337, 450, 28
  See application file for complete search history.

(56) References Cited

U.S. PATENT DOCUMENTS

| | | | |
|---|---|---|---|
| 5,331,409 | A | 7/1994 | Thurtell et al. |
| 5,373,160 | A | 12/1994 | Taylor |
| 8,866,322 | B2 * | 10/2014 | Tchoryk, Jr. ............ G01S 17/95 290/44 |
| 2007/0081162 | A1 | 4/2007 | Roller et al. |
| 2011/0164783 | A1 * | 7/2011 | Hays ..................... G01S 17/003 382/100 |
| 2011/0317147 | A1 * | 12/2011 | Campbell ............... G01S 17/34 356/5.09 |
| 2012/0050750 | A1 * | 3/2012 | Hays ..................... G01S 17/003 356/519 |
| 2012/0170043 | A1 | 7/2012 | Rao |
| 2012/0274937 | A1 * | 11/2012 | Hays ..................... G01S 17/58 356/337 |
| 2013/0314694 | A1 * | 11/2013 | Tchoryk, Jr. ......... G01N 21/538 356/28.5 |
| 2014/0125776 | A1 * | 5/2014 | Damaskinos ........ G02B 21/367 348/50 |
| 2015/0233962 | A1 * | 8/2015 | Tchoryk ................ G01S 7/4818 356/28.5 |
| 2020/0217969 | A1 | 7/2020 | Brydegaard |

OTHER PUBLICATIONS

Brydegaard, M., Gebru, A. and Svanberg, S., Super Resolution, Laser Radar with Blinking Atmospheric Particles—Application to Interacting Flying Insects:, Prog. Electromagn. Res., vol. 147, pp. 141-151 (2014).; figure 4.

Brydegaard, M., Elin Malmqvist, Samuel Jansson, Jim Larsson, Sandra Torok, Guangyu Zhao, "The Scheimpflug lidar method," Proc. SPIE 10406, Lidar Remote Sensing for Environmental Monitoring 2017, 104060I (Aug. 30, 2017); doi 10.117/12.2272939; Sections 2.2-2.3.

Rydhmer, K. & Strand, A., Applied hyperspectral LIDAR for monitoring fauna dispersal in aquatic Environments:, Division of Combustion Physics, Lund Reports on Combustion Physics, LRCP-196, Lund University, May 2016. ISNR LUTFD2/TFC-196-SE, ISSN 1102-8718.

International Search Report dated Sep. 10, 2018 for International Patent Application No. PCT/SE2018/050768 filed Jul. 14, 2018.

International Search Report dated Sep. 12, 2018 for International Patent Application No. PCT/SE2018/050769, filed Jul. 14, 2018.

Written Opinion dated Sep. 12, 2018 for International Patent Application No. PCT/SE2018/050769, filed Jul. 14, 2018.

Written Opinion dated Sep. 10, 2018 for International Patent Application No. PCT/SE2018/050768, filed Jul. 14, 2018.

Mei, "Remote Sensing of Atmospheric Aerosol and Gas Using Scheimpflug Lidar (SLidar) Based on Diode Lasers", Progress in Electromagnetic Research Symposium, 2016.

Zhao et al., "Inelastic Hyperspectral lidar for profiling aquatic ecosystems", Laser & Photonics Reviews, pp. 1-7, 2016.

Mei et al., "Continuous-wave differential absorption lidar," Laser & Photonics Reviews, vol. 9, No. 6, pp. 629-636, 2015.

Extended European Search Report received in European Application No. 18831597.2 dated Feb. 18, 2021 in 8 pages.

* cited by examiner

HIGH SPECTRAL RESOLUTION SCHEIMPFLUG LIDAR

TECHNICAL FIELD

The present disclosure relates to laser projection systems and more particularly to Scheimpflug LIDAR systems and methods.

BACKGROUND ART

A LIDAR or laser radar is an optical device for detection and ranging with applications in a very broad range of environments, from industrial combustion furnaces to ecosystem monitoring. In contrast to the now wide-spread topographical LIDAR systems which detect and range hard targets, atmospheric LIDARs have sufficient sensitivity to retrieve a continuous molecular echo from entirely clean air.

Atmospheric LIDARs have been around for several decades and they have been extensively applied to vertical profiles of aerosols in the troposphere. They are typically implemented in containers or trucks and comprise systems weighting several tons. Smaller commercial systems weighing several hundred kilograms have also been developed. The cost of such systems is approximately 1 Euro per gram of equipment. The conventional method used by such systems relies on Time-of-Flight (ToF) principles with expensive and bulky pulsed neodymium-doped yttrium aluminium garnet lasers of several hundred kilograms. The laser provide high peak powers (~100 MW) but the system has poor resolution in time and space (approx. ~1 minute and ~50 m). Elastic aerosol LIDAR systems are exceedingly challenging to calibrate and yield very little specificity for the aerosols sensed unless they are expanded by $N_2$ and $O_2$ Raman channels. Raman channels only work during night time, are very noisy and require even longer, averaging typically 10 minutes to produce a usable signal.

A highly specific atmospheric LIDAR method is the Differential Absorption LIDAR (DIAL). In this method, a pulsed tuneable laser targets specific molecular absorption lines and concentration profiles of a gas can be acquired. In practice, high peak powers (MW), short pulses (ns), narrow bands (<pm) and tunability contradict each other. Such DIAL systems typically require a small team of PhDs in laser physics to run. Some progress has been reported on lighter and smaller DIAL systems using micro-LIDAR, but still with time resolution in the order of 10 minutes. As a consequence, DIAL systems are immensely expensive and there are only a handful operational on a global basis. The low resolution, the cost and the bulkiness of DIAL systems prevent many practical applications such as industrial process optimization and mapping of greenhouse gas sources and fluxes.

There exists a need for a LIDAR method sufficiently sensitive enough to allow profiling, mapping and visualization of the exhausted $O_2$-hole from a single breath, e.g., with a resolution of millimetres, and capable of operating within milliseconds. This would allow the capture of the exhaust plume as it flies by, and the determination of the exhaust temperature.

Known problems with existing atmospheric LIDAR systems include the challenges in retrieving the spectrally narrow enough information to assess gas molecule absorption strengths. These limitations arise both on the transmitter and receiver sides. A solution is needed to address and overcome these limitations in order to advance the technology and make it practically competitive on the market.

SUMMARY

It is an objective of the disclosure to at least partly overcome one or more of the above-identified limitations of the prior art. One or more of these objectives, as well as further objectives that may appear from the description below, are at least partly achieved by means of a method for data processing, a computer readable medium, devices for data processing, and an optical apparatus according to the independent claims, embodiments thereof being defined by the dependent claims.

An aspect of the disclosure provides a method for detecting a property of a gas comprising: emitting a light, comprising a plurality of wavelengths covering a plurality of absorption lines of the gas, along a first axis, the light being scattered by particles of the gas resulting in a scattered light, generating a sensor image using a detection arrangement configured to receive the scattered light and comprising: an optical arrangement having an optical plane and being configured to direct the scattered light on to a light sensor, the light sensor having at least one pixel columns, wherein the pixel columns are aligned to an image plane and configured to output a sensor image, wherein the first axis, the optical plane, and the image plane intersect such that a Scheimpflug condition is achieved, determining, from the sensor image, properties of the gas at a plurality of positions along the first axis. The scattered light may be distributed across light sensor such that the photons of the scattered light are distributed along the pixel columns of the light sensor according to a position along the first axis where the photons were scattered. The optical arrangement may be configured to spectrally distribute the scattered light across light sensor. The light sensor may have a plurality of pixel rows and wherein the scattered light is distributed across light sensor such that the photons of the scattered light are distributed along the pixel rows of the light sensor according to a wavelength of the photons. The scattered light may be distributed across light sensor via a spectrometer or interferometer, e.g. a dispersive spectrometer, a virtually imaged phase array, or a Fabry-Perot cavity. The optical arrangement may further comprise a band pass filter to remove ambient noise. The optical arrangement may further comprise a lens and a slit and wherein the lens is configured to focus the scattered light onto the slit. The slit and image sensor may be arranged at a Brewster angle relative to an axis of the received scattered light. The tilted slit may be between 20 and 200 microns wide. A concentration of the gas may be determined at one or more positions along the first axis from an attenuation of at least one spectral band of the scattered light received at the light sensor. A concentration of the gas may be determined from an integral of the attenuation of at least one spectral band with respect to the position along the first axis. A concentration of the gas may be determined at one or more positions along the first axis from a ratio between an attenuation of at least two absorption lines of the scattered light received at the light sensor. A temperature of the gas may be determined at one or more positions along the first axis from a ratio between an attenuation of at least two absorption lines of the scattered light received at the light sensor. A temperature and/or pressure of the gas may be determined based on a fitting of a gas absorption profile to at least two spectral bands of the scattered light received at the light sensor. The concentration, temperature or pressure may be determined based on a ratio of at least two spectral bands and a derivative with respect to the position along the first axis. The emitted light may comprise photons having a wavelength in the range 760 nm to 762 nm, and wherein the method is used to determine $O_2$ levels in the gas. The emitted light may comprise photons having a wavelength in the range 934 nm to 936 nm, and wherein the method is used to determine $H_2O$ levels in the gas. Emitted light may be spectrally comprised to cover between 2 and 800 elastic spectral bands. A light source for the emitted light may be a multimode continuous wave laser diode configured to generate the spectral bands simultaneously. A light source for the emitted light may be a single mode laser diode configured to generate the spectral bands by spectral scanning. The step of determining properties of the gas from the sensor image may be performed according to a differential absorption lidar process.

Another aspect of the disclosure comprises a device for detecting a property of a gas comprising: a light source configured to emit a light comprising a plurality of spectral bands along a first axis, the light being scattered by particles of the gas resulting in a scattered light, a light detection arrangement comprising: an optical arrangement having an optical plane and being configured to direct the scattered light on to a light sensor, the light sensor having a plurality of pixel columns, wherein the pixel columns are aligned to an image plane and configured to output a sensor image, wherein the first axis, the optical plane, and the image plane intersect such that a Scheimpflug condition is achieved, the device being configured to determine, from the sensor image, properties of the gas at a plurality of positions along the first axis. The light source may be a single mode tuneable diode laser, and wherein the sensor image is calibrated by: emitting a light having a first wavelength, and calibrating the sensor image according to the first wavelength. Alternatively, the light source may be a multi-mode diode laser, and wherein the sensor image is calibrated by: emitting a light having a plurality of spectral bands, and calibrating the sensor image by matching a plurality of intrinsic spectral positions of absorption line profiles of the gas to the absorption lines indicated in the sensor signal. The device may be operated according to a differential absorption lidar methodology.

BRIEF DESCRIPTION OF DRAWINGS

These and other aspects, features and advantages of which examples of the disclosure are capable of will be apparent and elucidated from the following description of examples of the present invention, reference being made to the accompanying drawings, in which.

DETAILED DESCRIPTION OF EXAMPLE EMBODIMENTS

In the following, embodiments of the present invention will be presented for a specific example of a gas analysing apparatus.

Figure 1:
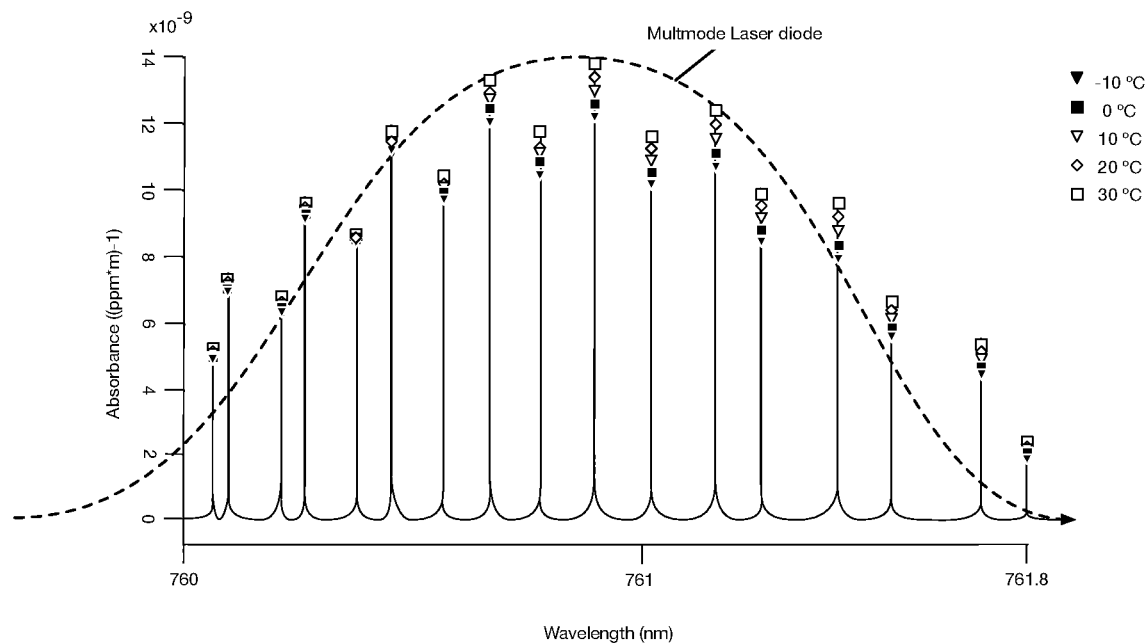
FIG. 1 shows $O_2$ lines at different temperatures superimposed on the output emission envelope of a multimode laser diode.

Embodiments are presented for an elastic hyperspectral lidar for pursuing differential absorption lidar (DIAL) on atmospheric gasses. In one embodiment, a multimode 10 W, 761 nm, 2 nm FWHM (Full width at half maximum) CW (continuous wave) laser diode may be employed. The acquisition of some 400 elastic spectral bands in the range 760 nm to 762 nm is performed. This will allow the resolving of a large number of $O_2$ absorption lines, as shown in FIG. 1. The absorption lines provide information on concentration, pressure and temperature of the air. Generally $O_2$ concentration in the atmosphere is 21%, but local exhausts after metabolism or combustion can produce $O_2$ holes. The drop in $O_2$ corresponds to the rise in $CO_2$ and $H_2O$. Consequently, the drop in $O_2$ may provide information on, e.g., the amount of metabolism present. Alternatively, the amount of fuel consumed by an engine may be determined, providing a means for normalizing aerosol emissions and assessing engine quality. This technique allows indirect assessment of profiling of $CO_2$, pressure and temperature. The plot of FIG. 1 displays $O_2$ lines at different temperatures superimposed on the emission of a multimode laser diode. Temperature and pressure are key parameters which are difficult to determine in meteorology and industrial processes.

The above embodiment is provided in contrast to a technique using single-mode diode lasers, where the laser is scanned over several absorption lines, called Tuneable Diode Laser Absorption Spectroscopy (TDLAS) which requires good light source stability (i.e. the wavelength of the source can be controlled in an accurate and stable manner) and a good spectral baseline model (i.e. the expected signal shape when no absorption is present). In practice the majority of limitations in TDLAS arise from source noise, speckles or interference fringes. These noise source also scale with source power and so stronger sources may not help improve the signal to noise ratio. However, the embodiment described above employing multimode diodes in Scheimpflug DIAL is made possible by two facts: 1) Absorption in DIAL does not rely on a baseline and a stable, fringe-free source because absorption is derived from the range derivative in Beer-Lamberts law and this is unrelated to laser stability. 2) All the spectral bands and on- and off-resonance lines are illuminated and exposed simultaneously. In other words, it will be a hyperspectral snapshot of the same atmosphere in space and time. A multimode Scheimpflug DIAL has light speed synchronization and self-calibration.

Gas temperature is a key parameter for many lidar applications. Temperature is challenging in TDLAS because it requires the single mode laser diode to scan broadly over at least one absorption line without mode hopping. In Time-of-Flight DIAL, apart from bulkiness, temperature is challenging because of low laser repetition rate and a trade-off between number of bands and static atmosphere assumptions. As can be seen in FIG. 1, a single high power multimode laser diode is capable of illuminating a large number of absorption lines, and some of these lines change substantially over ambient temperatures. In other words, a Scheimpflug $O_2$ DIAL system can be thought of as thousands of light-speed thermometers which can profile vertical gradients in ecosystems or be swept over an area to produce thermal air maps.

Dispersing light over 2 nm span into hundreds of spectral bands on a CMOS detector is not a trivial task. Nevertheless this has already been accomplished for other remote sensing instrument for Solar Induced Fluoresce (SIF) on vegetation such as NASAs carbon observatory. It can be done by brute force and employing a dispersive spectrometer of roughly one meters focal length. High Spectral Resolution Lidar can also be pursued by clever approaches with devices such as VIPAs (Virtually Imagined Phase Arrays) or Fabry-Perot cavities.

Figure 2:
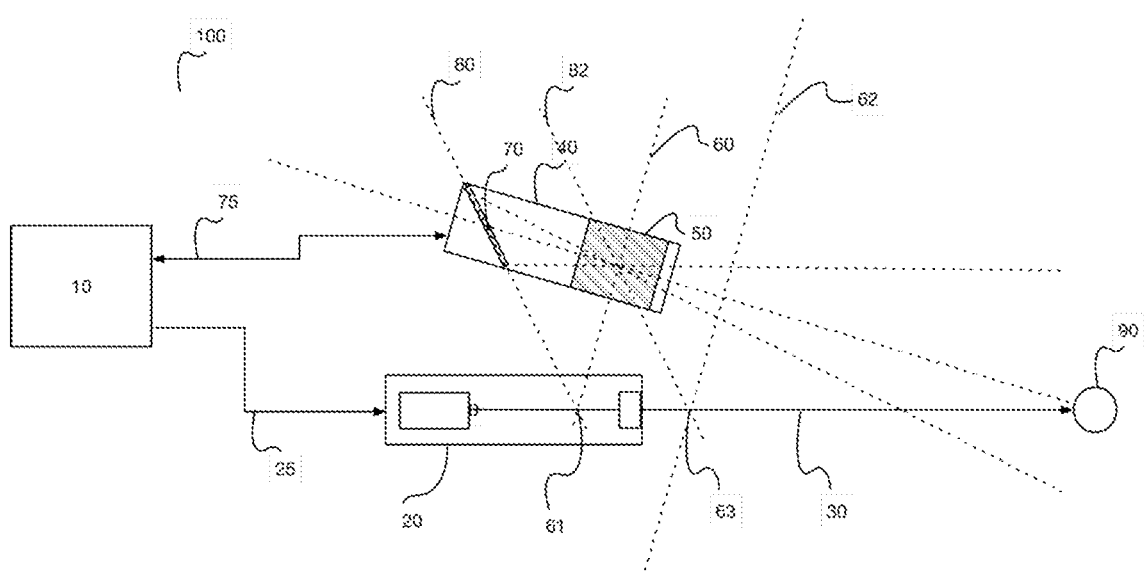
FIG. 2 shows an apparatus according to an embodiment of the disclosure.

FIG. 2 shows an embodiment of the apparatus 100. Hardware processor 10 drives light source 20 to emit light along a first axis 30. The light travels along axis 30 until being scattered back towards light detection arrangement 40 by a particle 90. Light detection arrangement 40 comprises an optical arrangement 50 having an optical plane 60 and being configured to direct the light scattered by the scattering particle to a light sensor 70. Light sensor has a pixel column aligned to an image plane 80 and configured to output a sensor signal 75 to the hardware processor. The first axis, the lens plane, and the image plane intersect such that a Scheimpflug condition is achieved. Furthermore, a displaced image plane 82, a front focal plane 62 of the lens arrangement, and a relationship between the light source and the light detection arrangement fulfil the Hinge rule at intersection 63. Hardware processor 10 processes the sensor signal to determine a pixel signal for one or more pixels of the light sensor.

The light source 20 may comprise one or more of; a narrowband single-mode source, a broad band multi-mode source, a high power multimode diode laser, a high power multimode fibre laser, a high power tapered amplifier seeded by a tuneable single mode diode laser, a high-power fibre amplifier seeded by a tuneable single mode diode laser, and a high power tuneable $CO_2$ laser.

The light detection arrangement 40 comprises a lens arrangement 50 having a lens plane 60, a displaced image plane 82, and a front focal plane 62. The light detection arrangement 40 is configured to direct the light scattered back from the gas to the light sensor 70. The first axis 30, the lens plane 60, and the image plane 80 intersect such that a Scheimpflug condition 61 is achieved. The displaced image plane 82, the front focal plane 62 of the lens arrangement 50, and first axis 30 intersect to achieve the Hinge rule intersection 63.

The lens arrangement 50 may comprise at least one of: an imaging lens comprising one or more light refracting components, and a mirror lens comprising a catadioptric optical system. The lens arrangement 50 comprises an f-number F/#, aperture, $\varnothing_{rec}$ and focal length, $f_{rec}$.

The light sensor 70 is preferably a linear CMOS array detector and may comprise of at least one column of pixels aligned to an image plane 80. The light sensor 70 is further configured to output a sensor signal 75. Light sensor 70 has a sensor length ($\ell_{sens}$), Sensor tilt (θ) a number of pixels. The pixels have a pixel height ($\ell_{pix}$), and pixel height ($w_{pix}$).

Hardware processor 10 is configured to drive light source 20 and to process the sensor signal to determine a property of the gas. Hardware processor 10 drives light source 20 to emit light along a first axis 30. The light travels along axis 30 until being scattered back towards light detection arrangement 40 by a particle 90. The scattered light passes through detection arrangement 40 and is received at sensor 70. A signal is generated by sensor 70 and transmitted to hardware processor 10 for processing.

After employing both the Scheimpflug principle and the Hinge rule, a number of design parameters remain for consideration. The apparatus may be designed with the following variables in mind: The transmitter-receiver baseline separation distance, $\ell_{BL}$, the receiver focal length, $f_{rec}$, and the tilt of the sensor with respect to the lens plane 60, θ. The transmitter-receiver baseline separation distance is defined as the perpendicular distance between lens arrangement 50 and first axis 30. The receiver focal length is defined as the perpendicular distance between lens plane 60 and front focal plane 62.

In an embodiment, data processing device 10 is configured to operate according to the following steps:

Step 1: Process sensor signal 75 to determine signal S when the light source is activated, and determine background signal B when the light source is not activated.

Step 2: Normalise signal S using background signal B. In one embodiment, background signal B is subtracted from signal S.

Step 3: Apply appropriate threshold and corrections for non-constant range dependency. The result of step 2 is the intensity-as-a-function-of-pixel-number signal. This must be converted to intensity-as-a-function-of-range signal. Consequently, this step comprises the transformation of the raw intensity-as-a-function-of-pixel-number signal to an intensity-as-a-function-of-range signal.

Step 4: Process the intensity-as-a-function-of-range signal to determine the presence of gas absorption imprints by retrieving the baseline model available from either: the multimode setup looking at the light which is on resonance and off resonance with a gas of interest or; through scanning a single-mode laser.

Step 5: Correlate the results of step 4 with previously determined results for noise reduction and/or to provide temporal information with respect to the results.

Step 6: Go to step 1.

The data processing device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an ND converter. The special-purpose software may be provided to the data processing device 10 on any suitable computer-readable medium, including a record medium and a read-only memory. The discrimination of co- and de-polarized light in LIDAR may provide microstructural information about LIDAR targets. Single scattering aerosol LIDAR may be defined as a type of atmospheric LIDAR sensitive to receive echoes from clean air. In single scattering aerosol LIDAR, the depolarization ratio (DoLP), which is defined as the intensity ratio between the perpendicular component and the parallel component of Raman scattered light, can differentiate between spherical and edgy or irregularly-shaped particles such as droplets and ice crystals respectively.

Figure 3:
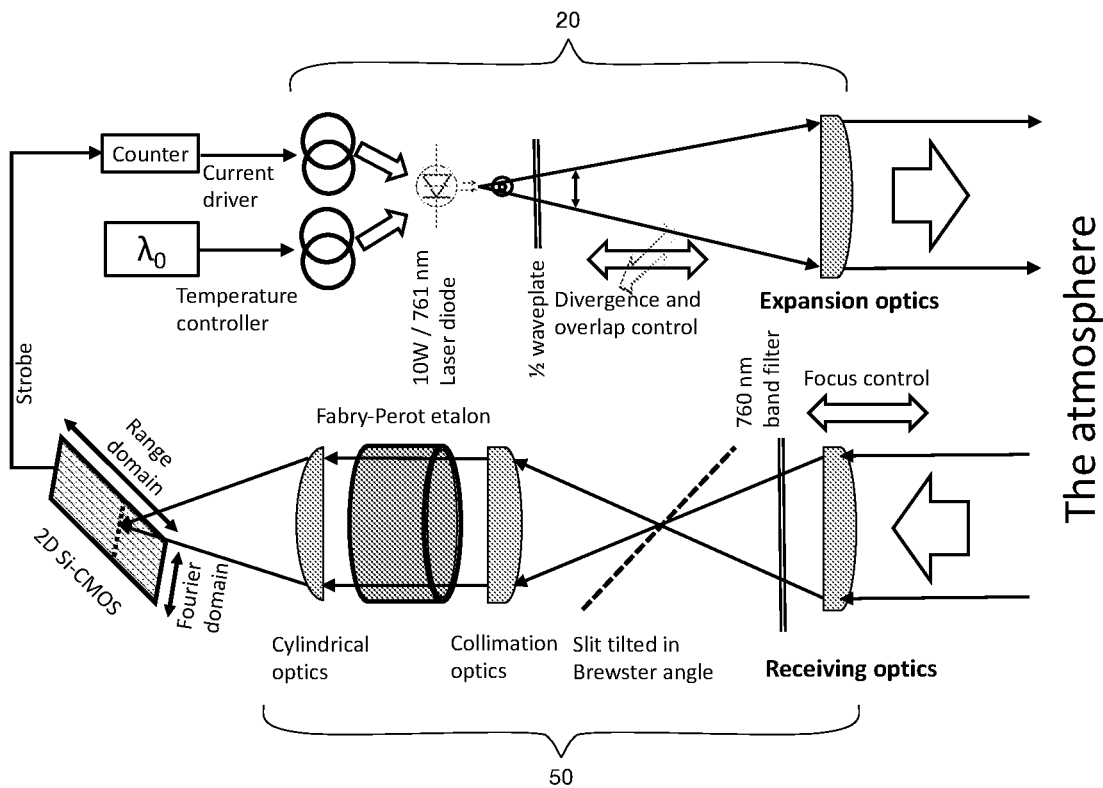
FIG. 3 shows a schematic of an embodiment of the disclosure.

FIG. 3 shows a schematic of the apparatus according to an embodiment of the disclosure. A high power broad band multimode diode of light source 20 is temperature-tuned to the $O_2$ A-band around 761 nm. The light from the diode is emitted and transmitted to the atmosphere. In the embodiment shown in FIG. 3, a ½ waveplate may be used to tailor the polarization of the emission for optimal performance. The expansion optics may comprise at least one of: an imaging lens comprising one or more light refracting components, and a mirror lens comprising a catadioptric optical system. The expansion optics shown in FIG. 3 may be employed to collimate and expand light from light source 20.

The collected atmospheric echo is then filtered via a bandpass filter to allow the light from the light source 20 to pass whilst filtering ambient light. The received light is then dispersed by optical arrangement 50, comprising a 4 cm Fabry-Perot etalon, and projected onto light sensor 70, comprising a 2D detector array. Hardware processor 10 modulates the laser diode for background subtraction.

In certain embodiments, the transmitter-receiver baseline separation distance $\ell_{BL}$ may be between 10-20 cm, the emitted beam may be ~ø5 mm, and aperture of the receiver optics may be ~ø75 mm. Receiver focal length $f_{rec}$ may be ~20 cm. The tilted slit may be 50 µm wide and configured to disperse the light to form ~400 spectral bands onto light sensor 70, comprising a 20×30 mm 2D Si-CMOS array. In one embodiment, the instrument may contain three linear micro actuators for adaptive alignment. These actuators control beam divergence, receiver focus, and the overlap between beam and field-of-view. These actuators may work on a slow time scale to optimize the signals in a closed-loop manner where the signal quality is continuously evaluated (signal strength and focus).

In one embodiment, the entire instrument, including the transmitter, receiver and all electronics, may be contained in a container with dimensions smaller than 12 cm×30 cm×80 cm and weighing less than 20 kg, and preferably 15 kg. In some embodiments, the container comprises a large extruded aluminium rectangular tube. The instrument may be hermetically sealed and weather proof.

A typical range for the embodiment described above is 200 m. In other embodiments, the apparatus is scaled up to profile the entire troposphere. This is achieved by increasing receiver optics. i.e. Increasing the size of the receiving optics to collect more light without changing the light source. Such a system would still have a spatial resolution of better than 1% of the range. A time resolution of the above embodiments may be less than 1 second. This should allow a determination of concentration of oxygen to a precision of below 1 per mille $O_2$. This should also allow a determination of temperature to a precision of below 1° C.

Figure 4:
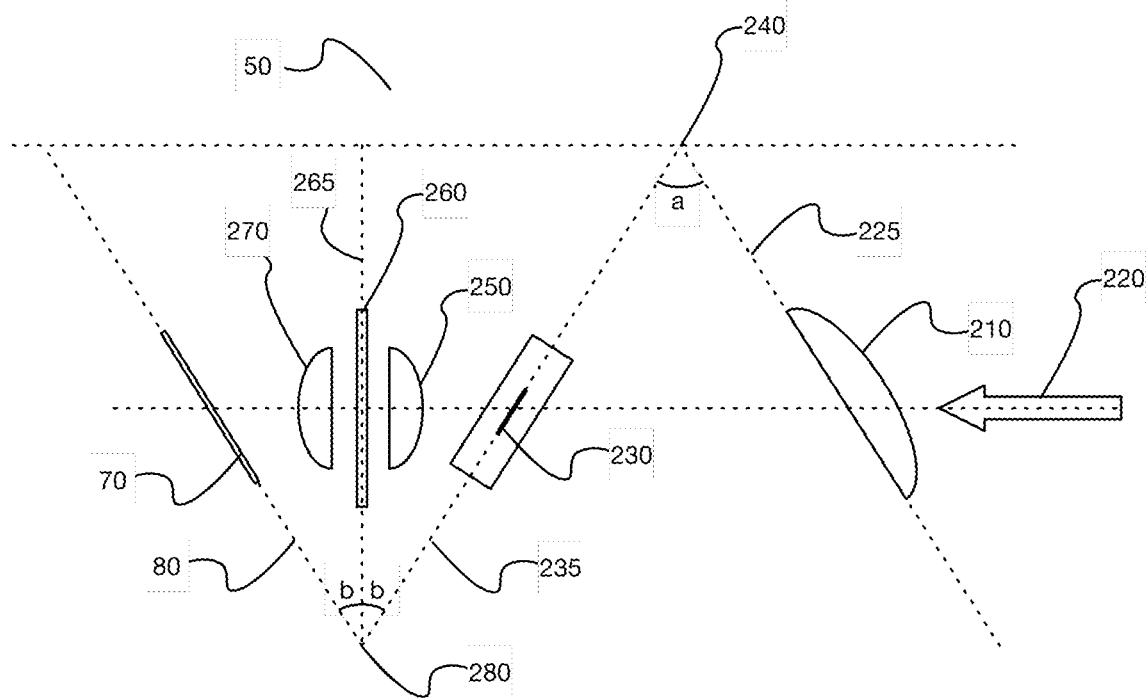
FIG. 4 shows an embodiment of the optical arrangement.

FIG. 4 shows an embodiment of optical arrangement 50. In this embodiment, scattered light 220 is received by lens 210. Lens 210 focuses light onto slit 230. An axis 235 of slit 230 and an axis 225 of lens 210 cross at a first Scheimpflug intersect point 240. The light from the slit is then directed onto collimating lens 250, which collimates the light and directs it through component 260. Component 260 may be a spectrometer or interferometer, e.g. a dispersive spectrometer, a virtually imaged phase array, or a Fabry-Perot cavity. Lens 270 then focuses the light onto sensor 70. The axis 80 of light sensor 70 and the axis 235 of slit 230 cross at a second Scheimpflug intersect point 280. The angle between axis 80 of light sensor 70 and the axis 265 along component 260 is the same as the angle between axis 235 of slit 230 and the axis 265 along component 260.

In some embodiments, the lens arrangement comprises an imaging interferometer. A first dimension of the 2D linear array of pixels corresponds to range and a second dimension on the 2D linear array of pixels may correspond to an interferogram. The imaging interferometer may be a static Fourier imaging interferometer of either a Michelsson, Fizeau, or Fabry Perot type.

In some embodiments, the light sensor 70 may comprise one or more of the following types: Si, InGaAs, InSb, HgCdTe, CCD, CMOS, EMCCD, intensified CCD, APD, multi-anode PMT. The lens arrangement may comprise at least one of a diffraction grating, a grating-prism, and a prism-grating-prism assembly. The first dimension of the 2D linear array of pixels corresponds to range and a second dimension of the 2D linear array of pixels may correspond to wavelength. In these embodiments, an absorption strength or profile of the gas is determined in dependence on a derivative of values along the first dimension of the 2D linear array of pixels, wherein a molecular specificity of the gas is determined in dependence on the known absorption lines of gas molecules, including O2, H2O, CH4, CO, CO2, NOx, and the absorption profile. The absorption profile of the gas may be determined in dependence on at least one of: direct absorption spectroscopy, wavelength modulation spectroscopy, and frequency modulation spectroscopy, and at least one of concentration, temperature, and pressure of the gas can be determined in dependence on absorption lines determined from an image of the 2D linear array of pixels or from an 1D linear array of pixels. From the image data collected from the sensor, at least one of the following may be determined through conventional gas spectroscopy methods:

a. the gas content, concentration, temperature or pressure is determined in dependence on at least one property of the gas absorption profiles or line shapes, b. the gas content and/or concentration, temperature, or pressure is determined in dependence on a combination of properties of multiple absorption lines, c. the gas concentration is determined as a function of the amplitude of at least one background compensated gas absorption profile, d. the gas temperature is determined as a function of the strengths of at least two gas absorption profiles, e. the gas pressure is determined as a function of the line widths of at least one gas absorption profile, f. the gas content/concentration, temperature and pressure is determined in dependence on a multivariate analysis based on at least one absorption profile, g. the gas content/concentration, temperature or pressure is determined in dependence on a combination of absorption profiles of at least one gas.

Figure 5:
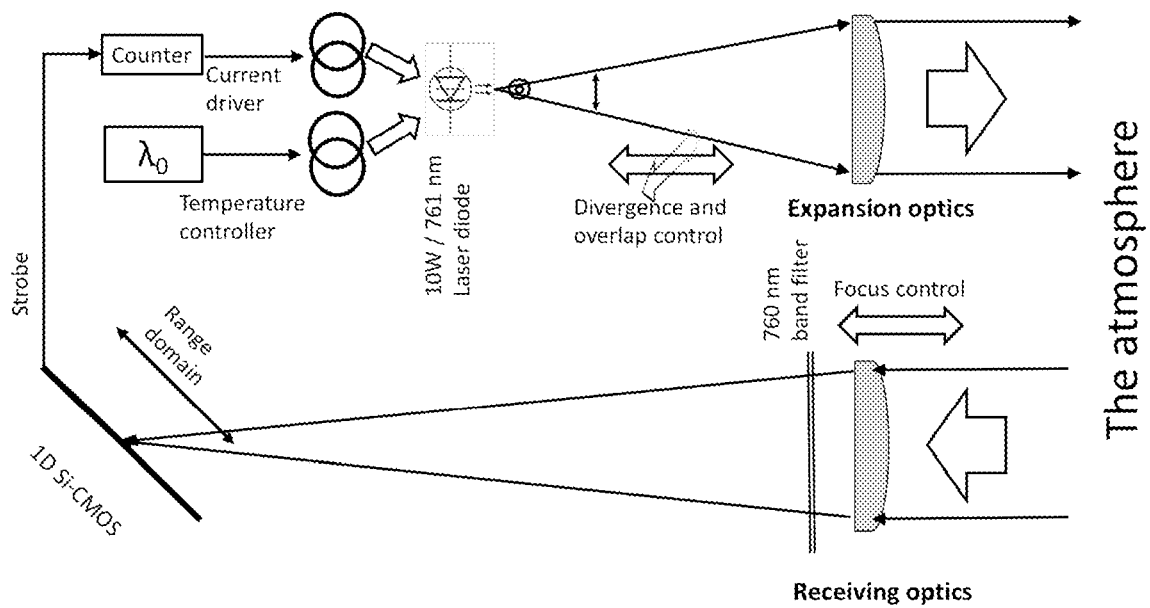
FIG. 5 shows a schematic of a scanning embodiment of the disclosure.

FIG. 5 shows an embodiment of the disclosure configured with a single mode laser diode. This configuration provides a narrowband tuneable light source wherein the wavelength of the light can be scanned across a range. As shown in the figure, the current driver is used to tune the wavelength, and to enable lambda to be scanned across the desired range. In a preferred embodiment for detection of $O_2$, the wavelength range used is 760 to 763 nm. This embodiment may be used to perform gas analysis via scanning and/or DIAL functions. The optical arrangement of this apparatus is similar to that shown in FIG. 3 but wherein the received light is directed onto a one dimensional sensor 70 directly by the receiving optics. Unlike the two dimension sensor embodiment described above, the second dimension needed for providing wavelength data is time, as readings for particular wavelengths can be continuously recorded as the light source is scanned across the wavelength range. The light source may be driven to spectrally scan the emitted light by means of at least one of: temperature scanning of the light source, current scanning of the light source, electromechanical scanning of the light source, and acousto-optic scanning of the light source, or electro optical scanning of the light source. An electromechanical scanning of the light source may comprises piezoelectric actuation of a cavity grating of the light source.

In an embodiment of the disclosure, the above described Scheimpflug LIDAR systems are employed to generate a two or three-dimensional map of a property of the gas by varying the direction of the first axis according to a geometric scan scheme. In one embodiment, a geometric scan scheme is used to determine the location of a volume of gas having a particular property. i.e. The geometric scan scheme may be used to determine the location of an emission source of the particular gas, such as a polluting ship or factory. The geometric scan scheme may comprise a pushbroom scan scheme or radial horizontal scan scheme. The detected gas may be an atmospheric gas and at least one meteorological property is determined, such as: atmospheric gas concentrations, temperature, pressure, and water volume. In some embodiments, a combustion quality measure is determined in dependence on the measure of least one of aerosols, $CO_2$, $H_2O$, and $O_2$ in the gas. The combustion quality measure is determined in dependence on a normalization of aerosols present in the gas to at least one of $CO_2$, $H_2O$, and $O_2$ present in the gas.

Figure 6:
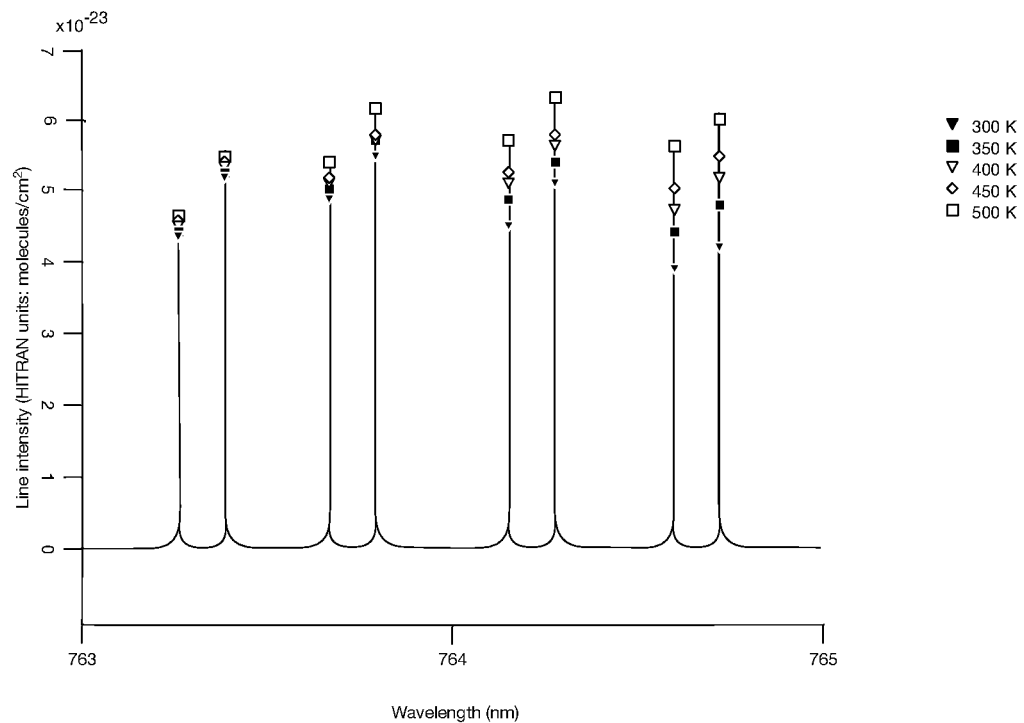
FIG. 6 shows $O_2$ lines at different temperatures.

FIG. 6 shows an example of absorption lines of $O_2$ and the line strength dynamics as a function of temperature. In an embodiment, the above described Scheimpflug LIDAR systems are employed to measure the strengths of a number of absorption lines for a specific molecule. The temperature of the molecule may be determined from the relative strengths of the absorption lines.

Some embodiments described above may be spectrally calibrated to ensure that the sensor signal outputs received wavelengths that match reality. Calibration may be performed according to at least the following methods. In a first embodiment wherein the apparatus comprises a single mode tuneable diode laser, the laser is configured to output a known wavelength. The sensor signal is then calibrated using the known wavelength. This may be repeated for a plurality of wavelengths to ensure calibration across the spectrum. In a second embodiment wherein the apparatus comprises a multi-mode diode laser configured to output a plurality of spectral bands, wavelength calibration is performed through matching of the intrinsic spectral positions of the absorption line profiles of a known target gas to the absorption lines indicated in the sensor signal.

The invention claimed is:

1. A method for detecting a property of a gas comprising:
   emitting a light, comprising a plurality of wavelengths covering a plurality of absorption lines of the gas, along a first axis, the light being scattered by particles of the gas resulting in a scattered light;
   generating a sensor image using a detection arrangement configured to receive the scattered light and comprising:
      an optical arrangement having an optical plane and being configured to direct the scattered light on to a light sensor; and
      the light sensor having at least one pixel columns, wherein the pixel columns are aligned to an image plane and configured to output a sensor image, wherein the first axis, the optical plane, and the image plane intersect such that a Scheimpflug condition is achieved;
   determining, from the sensor image, a set of gas specific absorption lines; and
   determining, from the set of gas specific absorption lines, properties of the gas at a plurality of positions along the first axis.

2. The method of claim 1, wherein the scattered light is distributed across light sensor such that the photons of the scattered light are distributed along the pixel columns of the light sensor according to a position along the first axis where the photons were scattered.

3. The method of claim 1, wherein the optical arrangement is configured to spectrally distribute the scattered light across light sensor.

4. The method of claim 1, the light sensor having a plurality of pixel rows and wherein the scattered light is distributed across light sensor such that the photons of the scattered light are distributed along the pixel rows of the light sensor according to a wavelength of the photons.

5. The method of claim 4, wherein the scattered light is distributed across light sensor via a spectrometer or interferometer, a dispersive spectrometer, a virtually imaged phase array, or a Fabry-Perot cavity.

6. The method of claim 1, wherein the optical arrangement further comprising a band pass filter to remove ambient noise.

7. The method of claim 1, wherein the optical arrangement further comprising a lens and a slit and wherein the lens is configured to focus the scattered light onto the slit.

8. The method of claim 7, wherein the slit and image sensor are arranged at a Brewster angle relative to an axis of the received scattered light.

9. The method of claim 7, wherein the tilted slit is between 20 and 200 microns.

10. The method of claim 1, wherein a concentration of the gas is determined at one or more positions along the first axis from an attenuation of at least one spectral band of the scattered light received at the light sensor.

11. The method of claim 10, wherein a concentration of the gas is determined from an integral of the attenuation of at least one spectral band with respect to the position along the first axis.

12. The method of claim 10, wherein a concentration of the gas is determined at one or more positions along the first axis from a ratio between an attenuation of at least two absorption lines of the scattered light received at the light sensor.

13. The method of claim 1, wherein a temperature of the gas is determined at one or more positions along the first axis from a ratio between an attenuation of at least two absorption lines of the scattered light received at the light sensor.

14. The method of claim 1, wherein a temperature and/or pressure of the gas is determined based on a fitting of a gas absorption profile to at least two spectral bands of the scattered light received at the light sensor.

15. The method of claim 1, wherein the concentration, temperature or pressure is determined based on a ratio of at least two spectral bands and a derivative with respect to the position along the first axis.

16. The method of claim 1, wherein the emitted light comprises photons having a wavelength in the range 760 nm to 763 nm, and wherein the method is used to determine $O_2$ levels in the gas.

17. The method of claim 1, wherein the emitted light comprises photons having a wavelength in the range 934 nm to 936 nm, and wherein the method is used to determine $H_2O$ levels in the gas.

18. The method of claim 1, wherein emitted light is spectrally comprised to cover between 2 and 800 elastic spectral bands.

19. The method of claim 1, wherein a light source for the emitted light is a multimode continuous wave laser diode configured to generate the spectral bands simultaneously.

20. The method of claim 1, wherein a light source for the emitted light is a single mode laser diode configured to generate the data over at least one spectral band by spectral scanning.

21. The method of claim 1, wherein the step of determining properties of the gas from the sensor image is performed according to a differential absorption lidar process.

22. A device for detecting a property of a gas comprising:
a light source configured to emit a light comprising a plurality of spectral bands along a first axis, the light being scattered by particles of the gas resulting in a scattered light,
a light detection arrangement comprising:
an optical arrangement having an optical plane and being configured to direct the scattered light on to a light sensor; and
the light sensor having a plurality of pixel columns, wherein the pixel columns are aligned to an image plane and configured to output a sensor image, wherein the first axis, the optical plane, and the image plane intersect such that a Scheimpflug condition is achieved, and
the device being configured to:
determine, from the sensor image, a set of gas specific absorption lines; and
determine, from the set of gas specific absorption lines, properties of the gas at a plurality of positions along the first axis.

23. The device of claim 22, wherein the light source is a single mode tuneable diode laser, and wherein the sensor image is calibrated by:
emitting a light having a first wavelength; and
calibrating the sensor image according to the first wavelength.

24. The device of claim 22, wherein the light source is a multi-mode diode laser, and wherein the sensor image is calibrated by:
emitting a light having a plurality of spectral bands; and
calibrating the sensor image by matching a plurality of intrinsic spectral positions of absorption line profiles of the gas to the absorption lines indicated in the sensor signal.

* * * * *